United States Patent
Zheng et al.

(10) Patent No.: US 9,800,564 B2
(45) Date of Patent: *Oct. 24, 2017

(54) METHODS, APPARATUSES AND COMPUTER PROGRAM PRODUCTS FOR UTILIZING VISUAL AUTHENTICATION TOKENS AS CROSS-PLATFORM CREDENTIALS

(71) Applicant: United Parcel Service of America, Inc., Atlanta, GA (US)

(72) Inventors: Weiqun Jack Zheng, Johns Creek, GA (US); Robert Frederick Myrick, Alpharetta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 84 days.

This patent is subject to a terminal disclaimer.

(21) Appl. No.: 14/839,480

(22) Filed: Aug. 28, 2015

(65) Prior Publication Data

US 2015/0373008 A1 Dec. 24, 2015

Related U.S. Application Data

(63) Continuation of application No. 13/973,586, filed on Aug. 22, 2013, now Pat. No. 9,154,490.

(Continued)

(51) Int. Cl.
*G06F 7/04* (2006.01)
*H04L 29/06* (2006.01)
(Continued)

(52) U.S. Cl.
CPC .............. *H04L 63/08* (2013.01); *G06F 21/33* (2013.01); *G06Q 10/083* (2013.01); *G06Q 10/0838* (2013.01)

(58) Field of Classification Search
None
See application file for complete search history.

(56) References Cited

U.S. PATENT DOCUMENTS

2005/0231368 A1 10/2005 Sasaki et al.
2010/0262453 A1* 10/2010 Robinson .............. G06Q 10/08
                                                          705/330

(Continued)

OTHER PUBLICATIONS

Web Wechat, "Web WeChat, FAQ," <https://login.weixin.qq.com/faq_webwx?lang=en_US>,. Oct. 9, 2013, 1 page.

(Continued)

*Primary Examiner* — Brandon Hoffman
(74) *Attorney, Agent, or Firm* — Alston & Bird LLP

(57) ABSTRACT

An apparatus is provided for facilitating cross-platform authentication. The apparatus may include at least one memory and at least one processor configured to detect that a visual token includes data indicating one or more authentication credentials for accessing a communication device in response to scanning the visual token. The computer program code may further cause the apparatus to communicate the authentication credentials of the detected visual token to the communication device to request the communication device to determine whether the authentication credentials are valid for a user. The computer program code may further cause the apparatus to enable access to the communication device in response to receiving an indication from the communication device that the authentication credentials of the detected visual token are valid. Corresponding computer program products and methods are also provided.

23 Claims, 9 Drawing Sheets

Related U.S. Application Data

(60) Provisional application No. 61/693,013, filed on Aug. 24, 2012.

(51) Int. Cl.
　　　*G06Q 10/08*　　　(2012.01)
　　　*G06F 21/33*　　　(2013.01)

(56) References Cited

U.S. PATENT DOCUMENTS

| | | |
|---|---|---|
| 2013/0124855 A1 | 5/2013 | Varadarajan et al. |
| 2014/0059666 A1 | 2/2014 | Zheng et al. |

OTHER PUBLICATIONS

Web Wechat, Web WeChat QR Scan Code, <https://wx.qq.com/?lang=en_US>, Oct. 9, 2013, 2 pages.
United States Patent and Trademark Office, Notice of Allowance for U.S. Appl. No. 13/973,586, Jun. 17, 2015, 5 pages, U.S.A.
United States Patent and Trademark Office, Office Action for U.S. Appl. No. 13/973,586, Jan. 26, 2015, 9 pages, U.S.A.
U.S. Appl. No. 61/559,635, Unpublished (filed Nov. 14, 2011) (Rammohan Varadarajan, Inventor).

* cited by examiner

METHODS, APPARATUSES AND COMPUTER PROGRAM PRODUCTS FOR UTILIZING VISUAL AUTHENTICATION TOKENS AS CROSS-PLATFORM CREDENTIALS

CROSS-REFERENCE TO RELATED APPLICATIONS

This application is a continuation of, and claims the benefit of U.S. Nonprovisional application Ser. No. 13/973,586, filed Aug. 22, 2013, which issued as U.S. Pat. No. 9,154,490 on Oct. 6, 2015 and, which claims the benefit of U.S. Provisional Application No. 61/693,013, filed Aug. 24, 2012, the contents of each of which are hereby incorporated herein in their entirety by reference.

TECHNOLOGICAL FIELD

Exemplary embodiments of the invention relate generally to methods, apparatuses and computer program products for authentication management and more particularly relates to a mechanism of facilitating cross-platform authentication to access one or more systems.

BACKGROUND

With an ever-increasing desire for customer-friendly shipping options, a need exists for a solution that allows authentication of customers to access shipping services via multiple platforms.

BRIEF SUMMARY

In general, the example embodiments of the present invention provide systems, methods, apparatus, and computer program products for utilizing codes associated with credentials to access a system (e.g., a platform). The codes may also be utilized to retrieve saved session information. The session information may be associated with a shipping session(s) corresponding to shipment data for shipment of parcels.

The exemplary embodiments may facilitate visualization of authentication certificates, tickets, or codes into visual tokens in a platform (e.g., a system). The visual tokens and associated cross-platform credentials may then be scanned, read, or otherwise received on a different platform (e.g., another system).

In one example embodiment, a method for facilitating cross-platform authentication is provided. The method may include detecting, via a first device, that a visual token includes data indicating one or more authentication credentials for accessing a communication device in response to scanning the visual token. The method may further include communicating, via the first device, the authentication credentials of the detected visual token to the communication device to request the communication device to determine whether the authentication credentials are valid for a user. The method may further include enabling access to the communication device, via the first device, in response to receiving an indication from the communication device that the authentication credentials of the detected visual token are valid.

In another example embodiment, an apparatus for facilitating cross-platform authentication is provided. The apparatus may include a processor and a memory including computer program code. The memory and computer program code are configured to, with the processor, cause the apparatus to at least perform operations including detecting that a visual token includes data indicating one or more authentication credentials for accessing a communication device in response to scanning the visual token. The memory and computer program code are also configured to, with the processor, cause the apparatus to communicate the authentication credentials of the detected visual token to the communication device to request the communication device to determine whether the authentication credentials are valid for a user. The memory and computer program code are also configured to, with the processor, cause the apparatus to enable access to the communication device in response to receiving an indication from the communication device that the authentication credentials of the detected visual token are valid.

In another example embodiment, a computer program product for facilitating cross-platform authentication is provided. The computer program product includes at least one computer-readable storage medium having computer-executable program code instructions stored therein. The computer-executable program code instructions may include program code instructions configured to detect, via a first device, that a visual token includes data indicating one or more authentication credentials for accessing a communication device in response to scanning the visual token. The computer program product may further include program code instructions configured to communicate, via the first device, the authentication credentials of the detected visual token to the communication device to request the communication device to determine whether the authentication credentials are valid for a user. The computer program product may further include program code instructions configured to enable access to the communication device, via the first device, in response to receiving an indication from the communication device that the authentication credentials of the detected visual token are valid.

BRIEF DESCRIPTION OF THE SEVERAL VIEWS OF THE DRAWINGS

Figure 1:
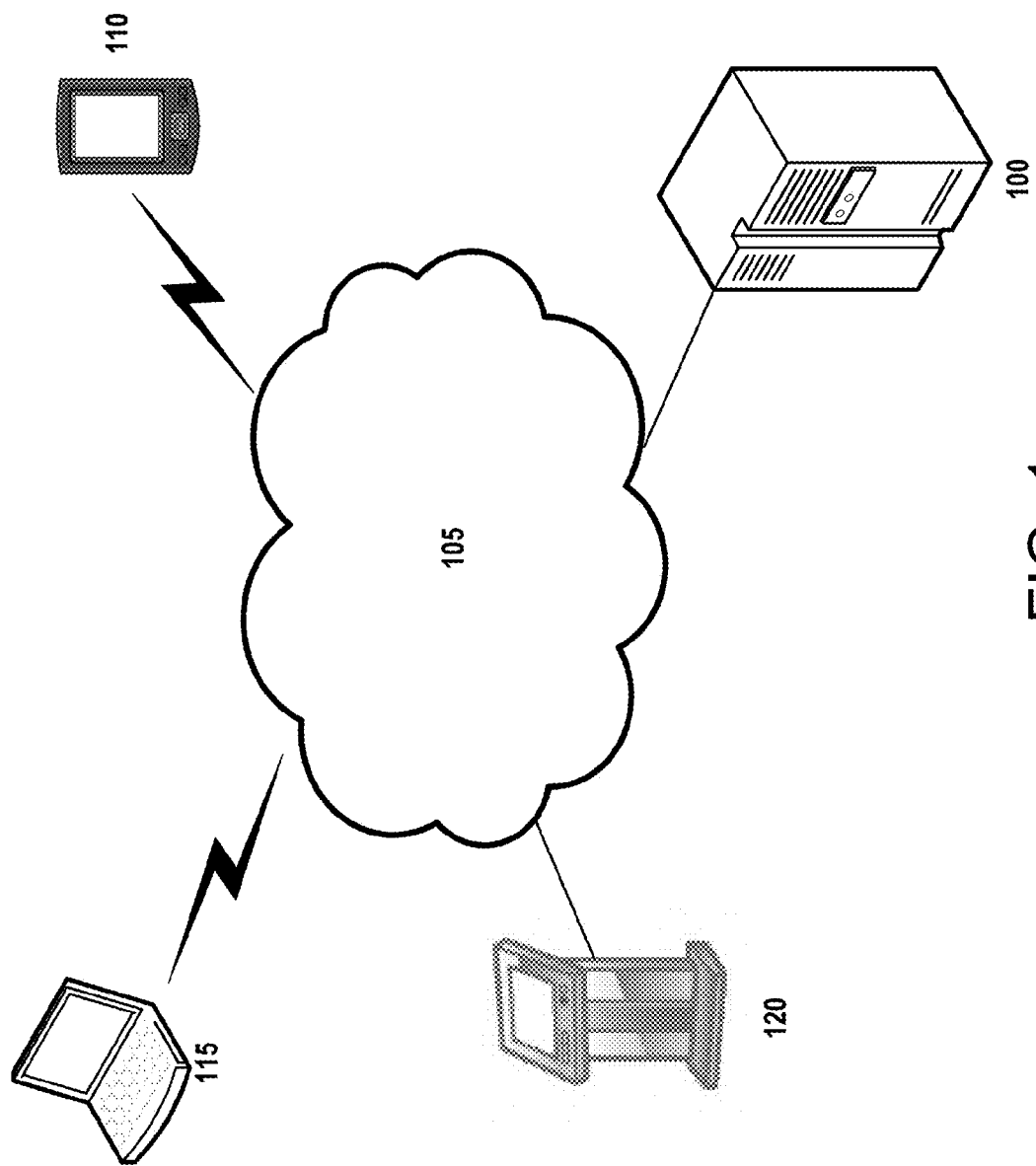

Having thus described the invention in general terms, reference will now be made to the accompanying drawings, which are not necessarily drawn to scale, and wherein:

FIG. 1 is an overview of a system that can be used to practice various embodiments of the invention.

Figure 2:
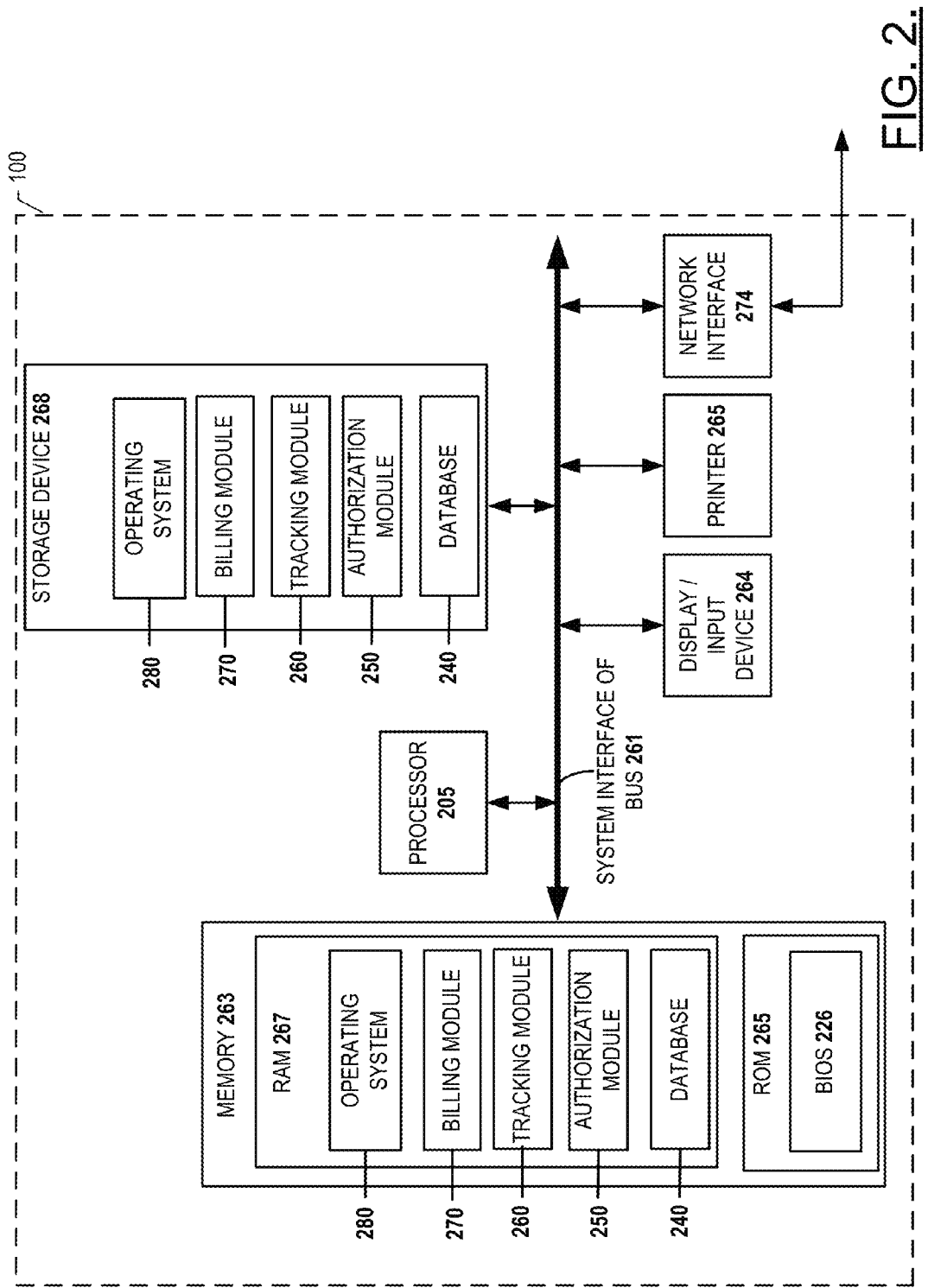

FIG. 2 is a schematic block diagram of a carrier communication device according to one exemplary embodiment of the invention.

Figure 3:
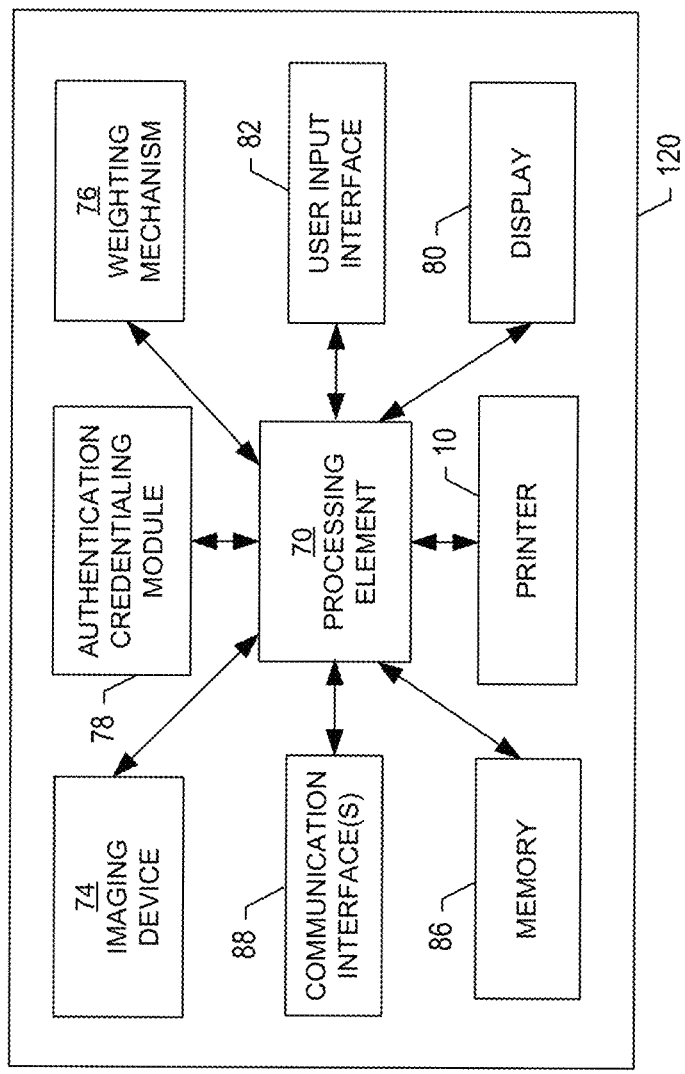
Figure 4:
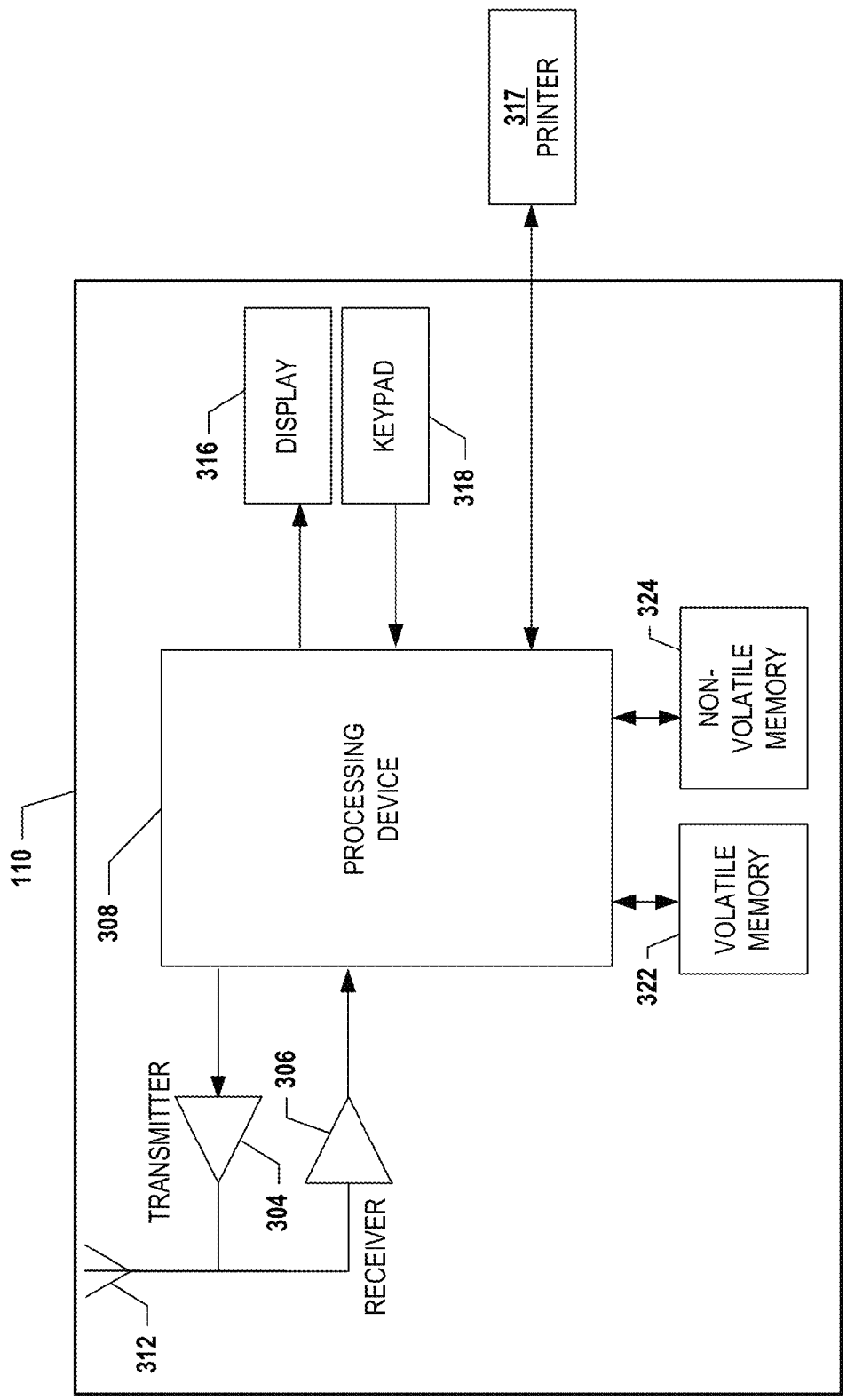
Figure 7:
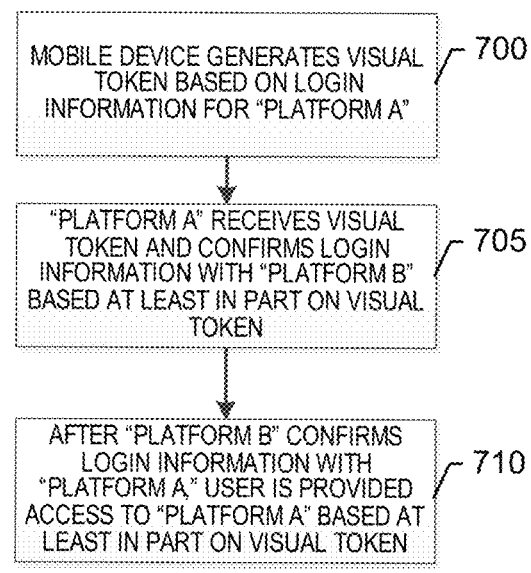
Figure 8:
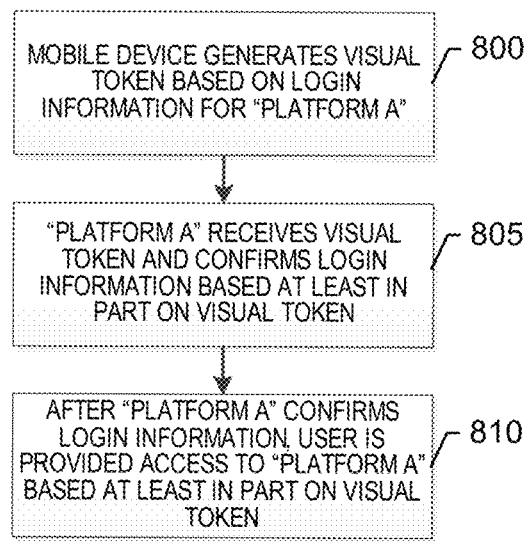
Figure 9:
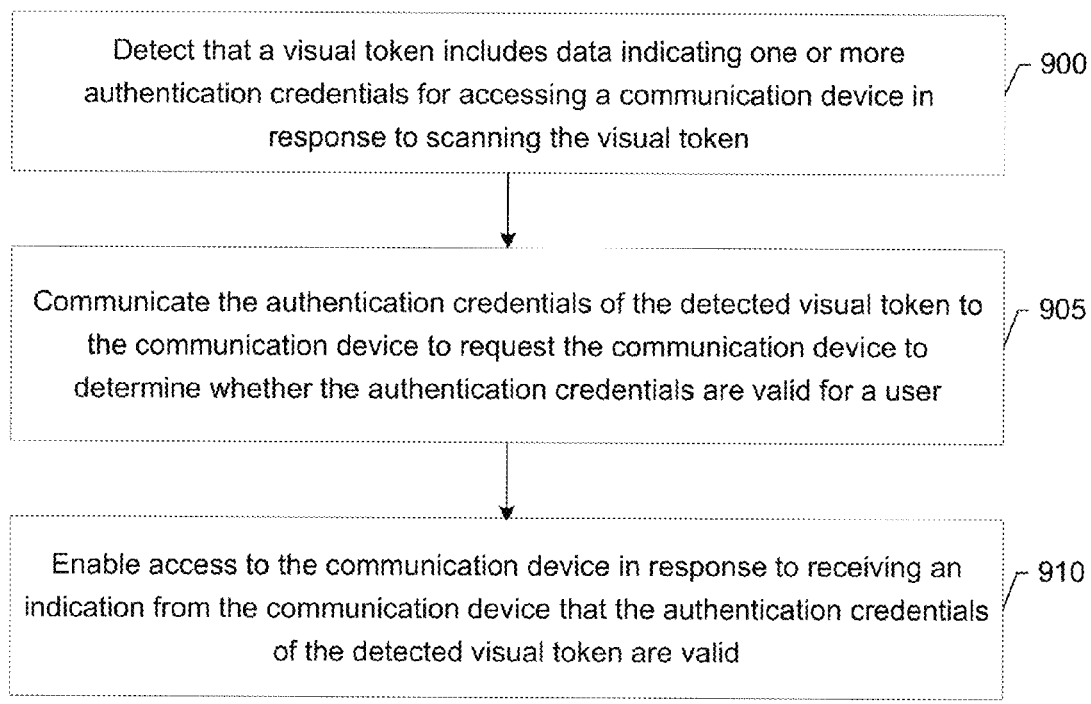

FIG. 3 is a schematic block diagram of a kiosk according to an exemplary embodiment of the invention;

FIG. 4 is a schematic block diagram of a mobile device according to an exemplary embodiment of the invention;

FIGS. 5-8 are flowcharts illustrating operations and processes that can be used in accordance with various exemplary embodiments of the invention; and FIG. 9 illustrates a flowchart of an exemplary method according to an exemplary embodiment of the invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein;

rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

As defined herein, a "computer-readable storage medium," which refers to a non-transitory, physical or tangible storage medium (e.g., volatile or non-volatile memory device), may be differentiated from a "computer-readable transmission medium," which refers to an electromagnetic signal.

Additionally, as referred to herein, a visual token(s) may refer to an image of a code(s) (e.g., Quick Response (QR) code(s), MaxiCode(s), barcode(s), etc.) that may be associated with one or more credentials (e.g., user identifier (ID), username, password, etc.) of a user for accessing a platform(s), device(s) or system(s).

I. EXEMPLARY SYSTEM ARCHITECTURE

FIG. 1 provides an illustration of a system that can be used in conjunction with various embodiments of the present invention. As shown in FIG. 1, the system may include one or more carrier communication devices 100, one or more networks 105, one or more mobile devices 110, one or more computing devices 115, and one or more kiosks 120. Each of the components of the system may be in electronic communication with, for example, one another over the same or different wireless or wired networks including, for example, a wired or wireless Personal Area Network ("PAN"), Local Area Network ("LAN"), Metropolitan Area Network ("MAN"), Wide Area Network ("WAN"), or the like. Additionally, while FIG. 1 illustrates certain system entities as separate, standalone entities, the various embodiments are not limited to this particular architecture.

1. Exemplary Carrier Communication Device

FIG. 2 provides a schematic of a carrier communication device 100 according to one embodiment of the present invention. In general, the term "communication device" may refer to, for example, any computer, computing device, mobile phone, desktop, notebook or laptop, distributed system, server, blade, gateway, switch, processing device, or combination of processing devices adapted to perform the functions described herein. In one example embodiment, the carrier communication device 100 may be in a carrier system maintained by a shipping carrier. In an alternative example embodiment, the carrier communication device 100 may be maintained by any other suitable entity.

As will be understood from this figure, in one embodiment, the carrier communication device 100 includes a processor 205 that communicates with other elements within the carrier communication device 100 via a system interface or bus 261. The processor 205 may be embodied in a number of different ways. For example, the processor 205 may be embodied as a processing element, a coprocessor, a controller or various other processing devices including integrated circuits such as, for example, an application specific integrated circuit ("ASIC"), a field programmable gate array ("FPGA"), a hardware accelerator, or the like.

In an exemplary embodiment, the processor 205 may be configured to execute instructions stored in the device memory or otherwise accessible to the processor 205. As such, whether configured by hardware or software methods, or by a combination thereof, the processor 205 may represent an entity capable of performing operations according to embodiments of the present invention when configured accordingly. A display device/input device 264 for receiving and displaying data may also be included in the carrier communication device 100. This display device/input device 264 may be, for example, a keyboard or pointing device that is used in combination with a monitor. The carrier communication device 100 further includes a printer 265. The printer 265 may print shipping information (e.g., shipping labels, shipping history data) as well as any other suitable data (e.g., codes (e.g., barcodes, Quick Response (QR codes, MaxiCodes, etc.)). The carrier communication device 100 further includes memory 263, which may include both read only memory ("ROM") 265 and random access memory ("RAM") 267. The carrier communication device's ROM 265 may be used to store a basic input/output system ("BIOS") 226 containing the basic routines that help to transfer information to the different elements within the carrier communication device 100.

In addition, in one embodiment, the carrier communication device 100 includes at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 268 may be connected to the system bus 261 by an appropriate interface.

Furthermore, a number of program modules may be stored by the various storage devices 268 and/or within RAM 267. Such program modules may include an operating system 280, a billing module 270, a tracking module 260, and an authorization module 250. These modules may control certain aspects of the operation of the carrier communication device 100 with the assistance of the processor 205 and operating system 280—although their functionality need not be modularized. In addition to the program modules, the carrier communication device 100 may store or be connected to one or more databases (e.g., database 240) with one or more tables stored therein.

Also located within the carrier communication device 100, in one embodiment, is a network interface 274 for interfacing with various computing entities. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the carrier communication device 100 may be configured to communicate via wireless external communication networks using any of a variety of protocols, such as 802.11, general packet radio service ("GPRS"), wideband code division multiple access ("W-CDMA"), or any other wireless protocol. Via the network interface 274, the carrier communication device 100 may be capable of sending and receiving text messages and/or instant messages.

It will be appreciated that one or more of the carrier communication device's 100 components may be located remotely from other carrier communication device 100 components. Furthermore, one or more of the components may be combined and additional components performing functions described herein may be included in the carrier communication device 100.

2. Exemplary Kiosk

FIG. 3 illustrates a block diagram of a kiosk according to an exemplary embodiment of the invention. The kiosk 120 includes various means for performing one or more functions in accordance with exemplary embodiments of the invention, including those more particularly shown and described herein. It should be understood, however, that one or more of the communication devices may include alternative means for performing one or more like functions, without departing from the spirit and scope of the invention. More particularly, for example, as shown in FIG. 3, the kiosk 120 may include a processor 70 connected to a memory 86. The memory may comprise volatile and/or non-volatile memory, and typically stores content (e.g., media content), data, information or the like.

For example, the memory 86 may store content transmitted from, and/or received by, other communication devices (e.g., carrier communication devices 100, mobile devices 110, and computing devices 115). In this regard, in an exemplary embodiment, the memory 86 may store data received from various disparate sources.

Also for example, the memory 86 typically stores client applications, instructions, algorithms or the like for execution by the processor 70 to perform steps associated with operation of the kiosk 120 in accordance with embodiments of the invention. As explained below, for example, the memory 86 may store one or more client applications such as for example software (e.g., software code also referred to herein as computer code).

The processor 70 may be embodied in a variety of ways. For instance, the processor 70 may be embodied as a controller, coprocessor, microprocessor of other processing devices including integrated circuits such as, for example, an application specific integrated circuit (ASIC), a field programmable gate array (FPGA). In an exemplary embodiment, the processor may execute instructions stored in the memory 86 or otherwise accessible to the processor 70.

The kiosk 120 may include one or more logic elements for performing various functions of one or more client applications. In an exemplary embodiment, the kiosk 120 may execute the client applications. The logic elements performing the functions of one or more client applications may be embodied in an integrated circuit assembly including one or more integrated circuits (e.g., an ASIC, FPGA or the like) integral or otherwise in communication with a respective network entity (e.g., computing system, client, server, etc.) or more particularly, for example, a processor 70 of the respective network entity.

In addition to the memory 86, the processor 70 may also be connected to at least one interface or other means for displaying, transmitting and/or receiving data, content or the like. The interface(s) can include at least one communication interface 88 or other means for transmitting and/or receiving data, content or the like. In this regard, the communication interface 88 may include, for example, an antenna and supporting hardware and/or software for enabling communications with a wireless communication network. For example, the communication interface(s) may include a first communication interface for connecting to a first network, and a second communication interface for connecting to a second network. In this regard, the kiosk 120 is capable of communicating with other communication devices (e.g., carrier communication devices 100, mobile devices 110, and computing devices 115) over one or more networks (e.g., network 105) such as a Local Area Network (LAN), wireless LAN (WLAN), Wide Area Network (WAN), Wireless Wide Area Network (WWAN), the Internet, or the like. Alternatively, the communication interface can support a wired connection with the respective network.

In addition to the communication interface(s), the interface(s) may also include at least one user interface that may include one or more earphones and/or speakers, a display 80, and/or a user input interface 82. The user input interface, in turn, may comprise any of a number of devices allowing the entity to receive data from a user, such as a microphone, a keypad, keyboard, a touch display, a joystick, image capture device, pointing device (e.g., mouse), stylus or other input device.

The kiosk 120 may also include a printer 10, and a weighing mechanism 76 such as for example scales (e.g., electronic scales). The printer 10 may print shipping information (e.g., shipping labels, shipping history information (e.g., shipping sessions) as well as any other suitable data. The weighting mechanism 76 (e.g., scales) may weigh one or more parcels (e.g., packages) or any other suitable items.

The kiosk 120 may also include an imaging device 74. The imaging device 74 may include one or more cameras, one or more scanners (e.g., laser scanners, infrared scanners), one or more imagers, one or more video cameras, one or more still cameras, one or more Internet Protocol (IP) cameras, one or more traffic cameras, and/or the like.

The imaging device 74 may be capable of scanning images and decoding images of codes, including but not limited to, barcodes, Quick Response (QR) codes, Maxi-Codes and/or the like. In one example embodiment, the imaging device 74 may scan and capture images of one or more codes (e.g., barcodes, QR codes, MaxiCodes, etc.) displayed on a mobile device (e.g., mobile device 110). In another example embodiment, the imaging device 74 may scan and decode captured images of one or more codes (e.g., barcodes, QR codes, MaxiCodes, etc.) on print media (e.g., paper, cardboard, plastic, etc.).

The imaging device 74 may include one or more wide angle lenses or one or more narrow angle lenses. The imaging device 74 may also include one or more processors and one or more temporary memory storage areas, such as circular buffers. Thus, the imaging device 74 may capture images (e.g., image data) and store them temporarily in the temporary memory storage area or permanently (in a separate memory storage area) within the imaging device 74. In one example embodiment, the imaging device 74 may also be connected to (or include) one or more network interfaces (e.g., wired or wireless) for communicating with various computing entities. This communication may be via the same or different wired or wireless networks using a variety of wired or wireless transmission protocols. This may allow the imaging device 74 to transmit/send images (e.g., image data) they capture.

The imaging data captured by the imaging device 74 may include one or more images of driver users faces, for example, for use in facial recognition, or detecting biometric data, and/or the like. The detected biometric data may include, but is not limited to, data associated with a shape of a body of a user(s), fingerprint data, face recognition of a user(s), iris recognition of a user(s), and retina recognition of a user(s). In one example embodiment, the detected biometric data may be utilized in part as a security mechanism for enabling a user to access the kiosk 120 or another communication device (e.g., carrier communication device 100) of a system (e.g., a carrier system).

The imaging device 74 may also be connected to (or include) a network interface (e.g., the wireless Ethernet bridge) for communicating with various computing entities. In one embodiment, the imaging device 74 can communicate with the carrier communication device 100 using protocols and stacks, such as sockets. The network interface may provide the ability for the imaging device 74 to serve as a web host with, for example, web pages that can be used to setup and configure the imaging device 74.

In an exemplary embodiment, the processor 70 may be in communication with and may otherwise control an authentication credentialing (AC) module 78. The AC module 78 may be any means such as a device or circuitry operating in accordance with software or otherwise embodied in hardware or a combination of hardware and software thereby configuring the device or circuitry (e.g., a processor, controller, microprocessor or the like) to perform the corresponding functions of the AC module 78, as described below. In examples in which software is employed, a device or circuitry (e.g., processor 70 in one example) executing the software forms the structure associated with such means. As such, for example, the AC module 78 may be configured to, among other things, analyze a code(s) (e.g., a barcode(s), QR code(s), MaxiCode(s), etc.) detected by the imaging device 74 and utilize the credentialing information (e.g., a user identifier (ID) and/or a password) associated with the detected code to enable a user(s) access (e.g., login) to a system (e.g., a carrier communication device 100 of a carrier system). In response to detecting the code(s), the AC module 78 may also determine a state (e.g., a user's login state) or session information (e.g., shipping history) of a user(s) associated with a system (e.g., carrier system), as described more fully below.

3. Exemplary Mobile Device

FIG. 4 provides an illustrative schematic representative of a mobile device 110 that may be used in conjunction with the embodiments of the present invention. As shown in FIG. 4, the mobile device 110 may include an antenna 312, a transmitter 304, a receiver 306, and a processing device 308 (e.g., a processor, controller, and/or the like) that provides signals to and receives signals from the transmitter 304 and receiver 306, respectively.

The signals provided to and received from the transmitter 304 and the receiver 306, respectively, may include signaling information in accordance with an air interface standard of applicable wireless systems. In this regard, the mobile device 110 may be capable of operating with one or more air interface standards, communication protocols, modulation types, and access types. More particularly, the mobile device 110 may operate in accordance with any of a number of second-generation ("2G") communication protocols, third-generation ("3G") communication protocols, fourth-generation ("4G") communication protocols, and/or the like. Further, for example, the mobile device 110 may operate in accordance with any of a number of different wireless networking techniques, including Bluetooth, IEEE 802.11 ("Wi-Fi"), 802.16 ("WiMAX"), ultra wideband ("UWB"), and/or the like. Via these communication standards and protocols, the mobile device 110 may communicate with the carrier communication device 100 and/or various other entities (e.g., computing devices 115 or kiosks 120). The mobile device 110 may also download changes, add-ons, and updates, for instance, to its firmware, software (e.g., including modules), and operating system.

The mobile device 110 may also comprise a user interface (that can include a display 316 coupled to a processing device 308) and/or a user input interface (coupled to the processing device 308). The user input interface can comprise any of a number of devices allowing the mobile device 110 to receive data, such as a keypad 318, a touch display, voice or motion interfaces, or other input device. The mobile device 110 may connect to an external printer 317. The printer 317 may print one or more codes (e.g., QR codes, MaxiCodes, barcodes, etc.) or any other suitable data. In embodiments including a keypad 318, the keypad 318 may include the conventional numeric (0-9) and related keys (#, *), and other keys used for operating the mobile device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Although not shown, the mobile device 110 may also include a battery, such as a vibrating battery pack, for powering the various circuits that are required to operate the mobile device 110, as well as optionally providing mechanical vibration as a detectable output.

The mobile device 110 may also include volatile memory 322 and/or non-volatile memory 324, which can be embedded and/or may be removable. For example, the non-volatile memory may be embedded or removable multimedia memory cards ("MMCs"), secure digital ("SD") memory cards, Memory Sticks, EEPROM, flash memory, hard disk, or the like. The memory can store any of a number of pieces or amount of information and data used by the mobile device 110 to implement the functions of the mobile device 110. The memory can also store content, such as computer program code for an application and/or other computer programs.

4. Additional Exemplary System Components

The computing devices 115 may each include one or more components that are functionally similar to those of the kiosk 120. For example, in one embodiment, each computing device 115 may include: (1) a processor that communicates with other elements via a system interface or bus; (2) a display; (3) a memory including both ROM and RAM; (4) a storage device; (5) a network interface; (6) an imaging device; an AC module; and (7) a printer. These architectures are provided for exemplary purposes only and are not limiting to the various embodiments. The term "computing device" is used generically to refer to any computer, mobile phone, computing device, desktop, notebook or laptop, distributed system, server, gateway, switch, or other processing device adapted to perform the functions described herein.

II. EXEMPLARY SYSTEM OPERATION

Reference will now be made to exemplary embodiments of a system for utilizing credentials (e.g., username and/or password), in part, associated with a detected code to access (e.g., login) a system (e.g., a carrier system). In addition, the credentials associated with the detected code may be utilized, in part, to determine a state (e.g., a user's login state) or session information (e.g., shipping session information (e.g., shipment history) associated with a user(s), as described more fully below.

a. Authenticating Credentials Via Cross Platforms

Figure 5:
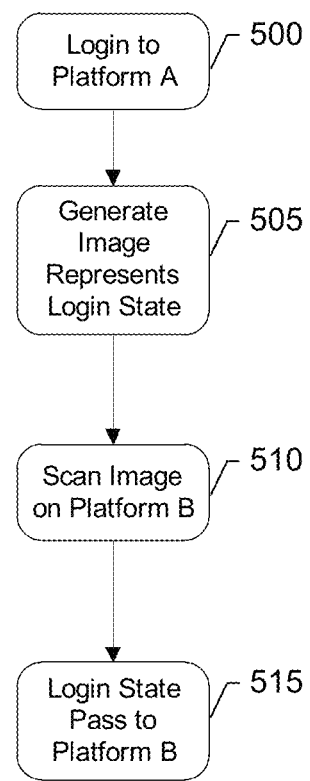

Referring now to FIG. 5, a flowchart of an exemplary method for facilitating cross platform authentication is provided according to an exemplary embodiment. At operation 500, an apparatus (e.g., mobile device 110) may login to a platform A (e.g., carrier communication device 100 of a carrier system). The apparatus (e.g., mobile device 110) may login to platform A (e.g., carrier communication device 100 of a carrier system) in response to receiving indications of login credentials (e.g., a user ID/username and/or a password) of a user (e.g., a shipping customer) of the apparatus (e.g., mobile device 110). At operation 505, the apparatus (e.g., mobile device 110) may generate an image (e.g., an image of a code (e.g., barcode, QR code, MaxiCode, etc.)) that represents the login state. In this regard, a processor (e.g., processing device 308) of the apparatus (e.g., mobile device 110) may associate the credentials (e.g., user ID/username and/or password) of the user's login with an image of the code. In an example embodiment, the image of the code associated with the credentials may be provided to a display (e.g., display 316) of the apparatus (e.g., mobile device 110). In another example embodiment, the image of the code associated with the credentials may be printed (e.g., on paper). For example, the image of the code associated with the credentials may be printed via a printer (e.g., printer 317) in response to receipt of an instruction or command from the apparatus (e.g., mobile device 110).

At operation 510, an apparatus (e.g., mobile device 110) may enable the image of the code to be scanned on platform B (e.g., kiosk 120 or a computing device 115). In this regard, the image of the code may be scanned by an imaging device (e.g., imaging device 74) of platform B (e.g., kiosk 120 or a computing device 115) in an instance in which the image of the code (e.g., displayed via display 316 or printed via printer 317) is detected by the imaging device in response to being in view of the imaging device (e.g., imaging device 74).

At operation 515, an apparatus (e.g., carrier communication device 100) passes or provides the login state to platform B (e.g., kiosk 120 or computing device 115). In this regard, in response to the imaging device (e.g., imaging device 74) decoding the credentials associated with a detected image of the code, an AC module (e.g., AC module 78) may provide the credentials to platform A (e.g., carrier communication device 100 of a carrier system). Platform A (e.g., carrier communication device 100 of a carrier system) may pass or provide the login state to platform B (e.g., kiosk 120 or computing device 115) in response to platform A verifying the credentials associated with the image of the code. As such, platform B may enable a user to access platform B (e.g., kiosk 120 or computing device 115) and login the user associated with the credentials to platform A (e.g., carrier communication device 100 of a carrier system).

In this manner, a user of an apparatus (e.g., mobile device 110) may be able to access platform B (e.g., kiosk 120 or computing device 115) in response to receiving verification, from platform A, that the login credentials (e.g., user ID/username, and/or password) associated with an image of a code (e.g., QR code, Maxicode, barcode, etc.) are valid. By obtaining access to platform B, a user of an apparatus (e.g., mobile device 110) may be able to access platform A, via platform B and communicate with or access data stored on platform A.

In some example embodiments, for added security, an AC module (e.g., AC module 78) may only allow access to the kiosk 120 or computing device 115 in response receipt of an indication of a valid pin number and/or biometric data (e.g., face recognition, shape of a body, iris recognition, retina recognition, etc.) associated with a user in addition to detecting valid credentials such as, for example, a user ID associated with a scanned image of a code (e.g., barcode, QR code, MaxiCode, etc.). In this regard, the AC module 78 may block or prohibit access to the kiosk 120 or computing device 115 in an instance in which the pin number and/or the biometric data associated with the user is invalid.

Additionally, in some example embodiments, the carrier communication device 100 of the carrier system may store state information (e.g., login state information (e.g., a user ID/username, password, etc.)) as well as session information associated with the user of an apparatus (e.g., mobile device 110). The session information may correspond to shipment information (e.g. previously created shipments, shipment history) setup by the user. As such, in one example embodiment, the kiosk 120 or the computing device 115 may automatically enable display of data (e.g., via display 80) associated with the session information in response to logging the user in to the carrier communication device 100 of the carrier system based in part on the credentials of the image of the code (e.g., barcode, QR code, MaxiCode, etc.). In this manner, the user may access the shipping information from the kiosk 120 or the computing device 115.

As such, apparatuses (e.g., mobile devices 110) of an exemplary embodiment may generate a code (e.g., QR Code) that may be used to access a carrier system (e.g., the carrier communication device 100 of the carrier system) via a kiosk 120 or computing device 115 without the user having to type in their user credentials at the kiosk 120 or the computing device 115.

b. Example Embodiment of Using a Code for Login & Obtaining Session Information

For purposes of illustration and not of limitation, in an instance in which a kiosk 120 or computing device 115 detects, via an imaging device (e.g., imaging device 74), a valid code (e.g., barcode, QR code, MaxiCode, etc.), an AC module (e.g., AC module 78) may communicate with the carrier communication device 100 of the carrier system and may automatically login a user to the carrier communication device 100, via the kiosk 120 or the computing device 115 based in part on the credentials associated with the code.

In response to logging the user in to the carrier communication device 100, the AC module (e.g., AC module 78) may access state information associated with the user and/or session information. As such, in an instance in which the AC module (e.g., AC module 78) analyzes data (e.g., data in memory 263) and determines that the user has only one partially-completed shipment saved in the user's shipping history, the AC module may enable display (e.g., via display 80) of the partially-completed shipment to the user via the kiosk 120 or the computing device 115.

On the other hand, in an instance in which the AC module analyzes data (e.g., data in memory 263) and determines that the user has more than one partially-completed shipment saved in the user's shipping history, the AC module may enable display (e.g., via display 80) of the list of all of the user's partially-completed shipments to the user via the kiosk 120 or the computing device 115.

In addition, in an instance in which the AC module analyzes data (e.g., data in memory 263) and determines that the user has no partially-completed shipments saved in the user's shipping history, the AC module may enable display (e.g., via display 80) of a main landing page to the user.

The main landing page (e.g., a webpage) may include all the options a user may perform at the kiosk 120 or computing device 115 once logged-in such as, for example, create a shipment, access shipping history, print shipment documentation, etc.

For purposes of illustration and not of limitation, in another example embodiment, a processor (e.g., processing device 308) of the mobile device 110 may be logged into a carrier system (e.g., carrier communication device 100 of the carrier system). The processor (e.g., processing device 308) of the mobile device 110 may generate an image of a code (e.g., QR Code, MaxiCode, or barcode). The image of the code may correspond to a visual token representing the user's login state with a carrier system (e.g., visual tokens may be generated from user IDs, usernames, passwords, login states, and/or the like). The visual token may be scanned, read, or otherwise received/detected by a kiosk 120 or computing device 115. The kiosk 120 or computing device 115 may receive the login state (e.g., user ID, username, password, login state, and/or the like) from the visual token and may confirm the login state with the carrier communication device 100 of the carrier system. In an instance in which, the login state is properly confirmed, the kiosk 120 or the computing device 115 may enable the user to complete or conduct activities (e.g., shipping activities) on the kiosk 120 or computing device 115 without requiring the user to manually enter the credentials (e.g., user ID, username and/or password) associated with the visual token.

Figure 6:
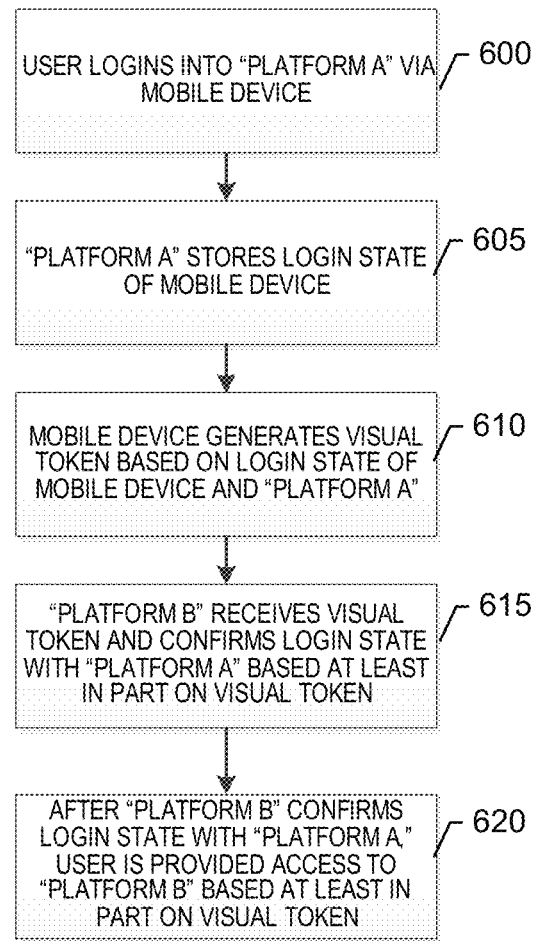

Referring now to FIG. 6, a flowchart of an exemplary method for authenticating a user via cross platforms is provided according to an exemplary embodiment. At operation 600, a user may login to platform A (e.g., carrier communication device 100 of a carrier system) via a mobile device (e.g., mobile device 110). At operation 605, platform A (e.g., carrier communication device 100 of the carrier system) may store a login state of a mobile device (e.g., mobile device 110). At operation 610, a mobile device (e.g., mobile device 110) may generate a visual token (e.g., an image of a code (e.g., QR code, MaxiCode, barcode, etc.)) based on the login state of the mobile device 110 and platform A (e.g., carrier communication device 100 of the carrier system).

At operation 615, platform B (e.g., kiosk 120 or computing device 115) may receive a visual token and may confirm the login state with platform A (e.g., carrier communication device 100 of the carrier system) based at least in part on the visual token (e.g., credentials (e.g., user ID/username and/or password associated with the visual token). At operation 620, after platform B confirms the login state with platform A, a user may be provided access to platform B (e.g., a kiosk 120 or computing device 115) based at least in part on the visual token.

Referring now to FIG. 7, a flowchart of an exemplary method for authenticating a user via cross platforms is provided according to another exemplary embodiment. At operation 700, a mobile device (e.g., mobile device 110) may generate a visual token (e.g., an image of a code (e.g., a QR code, a MaxiCode, a barcode, etc.)) based on login information (e.g., user ID/username and/or password) for platform A (e.g., carrier communication device 100 of the carrier system). At operation 705, platform A (e.g., kiosk 120 or computing device 115) may receive the visual token and confirm the login information with platform B based at least in part on the visual token. At operation 710, after platform B (e.g., carrier communication device 100 of the carrier system) confirms the login information with platform A, a user is provided access to platform A (e.g., kiosk 120 or computing device 115) based at least in part on the visual token.

Referring now to FIG. 8, a flowchart of another exemplary method for authenticating a user via cross platforms is provided according to an exemplary embodiment. At operation 800, a mobile device (e.g., mobile device 110) may generate a visual token based on login information (e.g., user ID/username, password, etc.) for platform A (e.g., carrier communication device 100 of a carrier system). At operation 805, platform A (e.g., carrier communication device 100 of a carrier system) may receive a visual token and confirm login information based at least in part on the visual token. At operation 810, after platform A (e.g., carrier communication device 100 of a carrier system) confirms login information, a user (e.g., a user of mobile device 110) is provided access to platform A based at least in part on the visual token.

Referring now to FIG. 9, a flowchart of an exemplary method for facilitating cross-platform authentication is provided according to an exemplary embodiment. At operation 900, an apparatus (e.g., kiosk 120 or computing device 115) may detect that a visual token includes data indicating one or more authentication credentials (e.g., a user ID, a username and/or a password) for accessing a communication device (e.g., carrier communication device 100 of a carrier system) in response to scanning (e.g., via imaging device 74) the visual token (e.g., an image of a code).

At operation 905, an apparatus (e.g., kiosk 120 or computing device 115) may communicate the authentication credentials of the detected visual token to the communication device (e.g., carrier communication device 100 of a carrier system) to request the communication device to determine whether the authentication credentials are valid for a user (e.g., a user of a mobile device 110). At operation 910, an apparatus (e.g., kiosk 120 or computing device 115) may enable access to the communication device (e.g., carrier communication device 100 of a carrier system) in response to receiving an indication from the communication device that the authentication credentials of the detected visual token are valid.

It should be pointed out that FIGS. 5, 6, 7, 8 and 9 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 86, memory 263, storage device 268, volatile memory 322, non-volatile memory 324) and executed by a processor (e.g., processor 205, processing device 308, processor 70, AC module 78). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 5, 6, 7, 8 and 9 above may comprise a processor (e.g., processor 205, processing device 308, processor 70, AC module 78) configured to perform some or each of the operations (500-515, 600-620, 700-710, 800-810, 900-910) described above. The processor may, for example, be configured to perform the operations (500-515, 600-620, 700-710, 800-810, 900-910) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (500-515, 600-620, 700-710, 800-810, 900-910) may comprise, for example, the processor 205 (e.g., as means for performing any of the operations described above), the processing device 308, the processor 70, the AC module 78 and/or a device or circuitry for executing instructions or executing an algorithm for processing information as described above.

III. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   detecting, via a first device, that a visual token comprises data indicating one or more authentication credentials for accessing a communication device in response to scanning the visual token;
   communicating, via the first device, the authentication credentials of the detected visual token to the communication device to request the communication device to determine whether the authentication credentials are valid for a user; and
   utilizing, via the first device, the visual token, in part, to retrieve previously saved session information from the communication device in response to receipt of an indication from the communication device that the authentication credentials are valid, the session information corresponding to shipment data for shipment of at least one item.

2. The method of claim 1 wherein prior to utilizing the visual token, the method further comprises:
   enabling access to the communication device, via the first device, in response to receiving an indication from the communication device that the authentication credentials of the detected visual token are valid.

3. The method of claim 2, wherein enabling access further comprises automatically enabling access, via the first device, to information at the communication device based in part on receiving the indication that the authentication credentials of the detected visual token are valid.

4. The method of claim 3, wherein the information comprises shipment history information initially generated at the communication device.

5. The method of claim 4, further comprising:
   presenting display, via the first device, of a partially completed shipment in response to receiving an indication from the communication device that the information indicates that the user has one partially completed shipment saved in the shipment history.

6. The method of claim 4, further comprising:
   presenting display, via the first device, of a plurality of partially completed shipments of the user in response to receiving an indication from the communication device that the information indicates that the user has more than one partially completed shipment saved in the shipment history.

7. The method of claim 4, further comprising:
   presenting display, via the first device, of a page in response to receiving an indication from the communication device that the information indicates that the user does not have any partially completed shipment saved in the shipment history,
   wherein the page comprises visible indicia presenting one or more shipping options to the user.

8. The method of claim 1, wherein:
   detecting further comprises detecting that the visual token comprises an image of a code associated with the authentication credentials.

9. The method of claim 8, wherein:
   the code comprises at least one of a Quick Response code, a MaxiCode or a barcode; and
   the authentication credentials comprises at least one of a user identifier, a username or a password.

10. The method of claim 1, wherein the first device comprises a kiosk or a computing device.

11. An apparatus comprising:
    at least one processor and at least one memory including computer program code, the at least one memory and the computer program code configured to, with the processor, cause the apparatus to at least:
    detect that a visual token comprises data indicating one or more authentication credentials for accessing a communication device in response to scanning the visual token;
    communicate the authentication credentials of the detected visual token to the communication device to request the communication device to determine whether the authentication credentials are valid for a user; and
    utilize the visual token, in part, to retrieve previously saved session information from the communication device in response to receipt of an indication from the communication device that the authentication credentials are valid, the session information corresponding to shipment data for shipment of at least one item.

12. The apparatus of claim 11, wherein prior to utilize the visual token, the memory and computer program code are further configured to, with the processor, cause the apparatus to:

enable access to the communication device in response to receiving an indication from the communication device that the authentication credentials of the detected visual token are valid.

13. The apparatus of claim 12, wherein the memory and computer program code are further configured to, with the processor, cause the apparatus to:
enable access by automatically enabling access to information at the communication device based in part on receiving the indication that the authentication credentials of the detected visual token are valid.

14. The apparatus of claim 13, wherein the information comprises shipment history information initially generated at the communication device.

15. The apparatus of claim 14, wherein the memory and computer program code are further configured to, with the processor, cause the apparatus to:
present display of a partially completed shipment in response to receiving an indication from the communication device that the information indicates that the user has one partially completed shipment saved in the shipment history.

16. The apparatus of claim 14, wherein the memory and computer program code are further configured to, with the processor, cause the apparatus to:
present display of a plurality of partially completed shipments of the user in response to receiving an indication from the communication device that the information indicates that the user has more than one partially completed shipment saved in the shipment history.

17. The apparatus of claim 14, wherein the memory and computer program code are further configured to, with the processor, cause the apparatus to:
present display of a page in response to receiving an indication from the communication device that the information indicates that the user does not have any partially completed shipment saved in the shipment history,
wherein the page comprises visible indicia presenting one or more shipping options to the user.

18. The apparatus of claim 11, wherein the memory and computer program code are further configured to, with the processor, cause the apparatus to:
detect by detecting that the visual token comprises an image of a code associated with the authentication credentials.

19. The apparatus of claim 18, wherein:
the code comprises at least one of a Quick Response code, a MaxiCode or a barcode; and
the authentication credentials comprises at least one of a user identifier, a username or a password.

20. The apparatus of claim 11, wherein the apparatus comprises a kiosk or a computing device.

21. A computer program product comprising at least one non-transitory computer readable storage medium having computer-readable program code portions stored therein, the computer-readable program code portions comprising:
program code instructions configured to detect, via a first device, that a visual token comprises data indicating one or more authentication credentials for accessing a communication device in response to scanning the visual token;
program code instructions configured to communicate, via the first device, the authentication credentials of the detected visual token to the communication device to request the communication device to determine whether the authentication credentials are valid for a user; and
program code instructions configured to utilize, via the first device, the visual token, in part, to retrieve previously saved session information from the communication device in response to receipt of an indication from the communication device that the authentication credentials are valid, the session information corresponding to shipment data for shipment of at least one item.

22. The computer program product of claim 21, wherein prior to utilize the visual token, the computer program product further comprises:
program code instructions configured to enable access to the communication device, via the first device, in response to receiving an indication from the communication device that the authentication credentials of the detected visual token are valid.

23. The computer program product of claim 22, wherein enable access further comprises automatically enabling access, via the first device, to information at the communication device based in part on receiving the indication that the authentication credentials of the detected visual token are valid.

* * * * *